United States Patent [19]

Lapakko

[11] Patent Number: 4,783,318
[45] Date of Patent: Nov. 8, 1988

[54] APPARATUS FOR ENVIRONMENTAL LEACHING TESTING

[75] Inventor: Kim A. Lapakko, Minneapolis, Minn.

[73] Assignee: The State of Minnesota, St. Paul, Minn.

[21] Appl. No.: 103,757

[22] Filed: Oct. 2, 1987

[51] Int. Cl.$^4$ .......................................... B01P 29/04
[52] U.S. Cl. .................... 422/101; 422/103; 210/258; 210/406; 210/416.1; 210/482
[58] Field of Search ................ 422/101-103, 422/278, 282, 283; 210/258, 416.1, 406, 482; 423/658.5

[56] References Cited

U.S. PATENT DOCUMENTS

| | | | |
|---|---|---|---|
| 2,110,237 | 3/1938 | Parsons | 422/101 |
| 2,136,170 | 11/1938 | Luertzing | 422/101 |
| 2,202,055 | 5/1940 | Juffa | 422/101 |
| 2,879,207 | 3/1959 | Poitras . | |
| 3,319,792 | 5/1967 | Leder et al. . | |
| 3,630,683 | 12/1971 | Robb . | |
| 3,782,175 | 1/1974 | Roman | 210/406 |
| 3,788,483 | 1/1974 | Conway | 210/416.1 |
| 3,838,978 | 10/1974 | Eddleman et al. . | |
| 4,160,803 | 7/1979 | Potts . | |
| 4,162,979 | 7/1979 | Wahlefeld et al. . | |
| 4,166,720 | 9/1979 | Weber . | |
| 4,301,010 | 11/1981 | Eddleman et al. | 422/101 |
| 4,357,240 | 11/1982 | Mehra et al. . | |
| 4,406,786 | 9/1983 | Hein . | |
| 4,468,321 | 8/1984 | St. John | 210/482 |
| 4,673,501 | 6/1987 | Wells et al. | 422/101 |

Primary Examiner—Barry S. Richman
Assistant Examiner—Timothy M. McMahon
Attorney, Agent, or Firm—Orrin M. Haugen; Thomas J. Nikolai; Frederick W. Niebuhr

[57] ABSTRACT

An apparatus used to separate solid-phase materials from rinse water containing soluable constituents dissolved from rock or ore bodies by percolation of water therethrough is described. The apparatus includes an upper funnel and a bottom receptacle as well as a central passage member disposed therebetween. The upper funnel includes a perforated bottom and a central standpipe. The bottom receptacle includes a pair of vacuum tubes. The central member includes a plurality of filter members. When in use, filtration through some or all of the filters can be aided by applying a suction to the vacuum tubes.

6 Claims, 4 Drawing Sheets

APPARATUS FOR ENVIRONMENTAL LEACHING TESTING

BACKGROUND OF THE INVENTION

The present invention relates to an apparatus and method for use in conducting leaching experiments on solids, including samples taken from stockpiles of ore, and/or tailings, or other mineral residues which are deposited on the surface of the land and exposed to the environment over extended periods of time. The leaching apparatus of the present invention is used to separate solid-phase materials and substances from rinse water containing soluble constituents dissolved from rock or ore bodies by percolation of water therethrough. The rinse water may then be analyzed to quantitatively determine the extent and nature of any contamination occasioned by contact of water and rock. Additionally, the solids may be maintained in a reasonably controlled environment, and weighed periodically to determine the extent of weight reduction occasioned by periodic exposure to water.

More particularly, the present invention relates to a method and apparatus which includes an upper leaching or holding chamber superimposed upon a plurality of serially arranged filter members. Vacuum means are provided to assist in the rapid transfer of the aqueous portions through some or all of said filter members. Use of such vacuum means, however, is not necessary if the particles that are to be filtered are relatively large. Pollutants and contaminants can enter water supplies either through ground water and/or surface water, and hence it is of interest to ascertain the extent to which solids, including dissolved solids are leached from the mineral residue samples.

It is well known in the prior art that solid phase materials can be separated from a liquid sample by transferring the liquid sample through a filter typically situated in a communicating passage between a first and a second container. Further, the prior art discloses the use of a vacuum assisted transfer between two receptacles having a filter interposed therebetween. See U.S. Pat. No. 3,782,175 issued to Michael H. Roman on Jan. 1, 1974, for example.

However, there is a real need in the art for an apparatus which incorporates a plurality of serially arranged and spaced apart filter elements wherein passage of liquid is assisted across all or certain selected filter elements by a vacuum. This is particularly true when it is desirable to test the environmental effects of earth surface wastes on rain water as it percolates through the wastes and subsequently flows to a subterranean aquifer or well or over the ground to form a supply source to a lake, stream, river or the sea. Such a device would most effectively permit one to quantitatively determine, experimentally, levels of dissolved solids comprising a source of potential contaminants such as sulfur, copper, nickel, cobalt, zinc, calcium, magnesium, sodium and potassium in an effluent. The apparatus also permits the conductance and pH of the resulting effluent to be determined experimentally. Further, the apparatus permits the solids to be weighed periodically to determine moisture content.

The principal object of the present invention is to provide a novel, inexpensive apparatus and method for removing constituent parts of solid mineral residues through leaching, gathering the effluent through filtration, and thereby determine the extent of leaching expected to occur in surface stored mineral residues, such as ore supplies, mineral tailings, and the like. Another object of the invention is to provide such an apparatus which economizes from the standpoints of space, solid sample requirement, and time.

Another object of the invention is to provide an apparatus for expeditiously separating an effluent from a mixture of solid mineral residue, particularly ore, tailings or other mineral solids, so that the degree of transfer of soluble components to the effluent can be determined.

Still another object of the invention is to provide an apparatus for determining experimentally the level of contamination to be expected in naturally occurring effluents, such as rainwater passing through a bed of mineral such as a stockpile of ore and/or tailings, said apparatus incorporating a plurality of filters, transfer of liquid through some of which is vacuum assisted.

A further object of the invention is to provide a method for separating an effluent from particulate solids so that the degree of potential contamination of the effluent can be determined, said method involving the use of an apparaus which includes an upper chamber, a lower chamber, a passageway between said upper and lower chamber in which a plurality of filter members are interposed, and means for providing a vacuum to assist transfer of the liquid across selected ones of said filter members.

SUMMARY OF THE INVENTION

In accordance with the foregoing objectives, the apparatus of the present invention includes an upper funnel or receiver having a perforated plastic plate near its bottom which acts as a filter. Extending from the center of the plate to the top of the upper receiver or funnel is a plastic tube or standpipe. If desired, an additional filter member can be placed in the upper receiver so that it rests on the perforated plastic plate and surrounds the standpipe.

The apparatus of the present invention also includes a bottom receptacle container having a first and second vacuum tube coupled thereto. Disposed between the upper receiver and the bottom container is a central passage member. The central passage member includes a second funnel, the top of which is covered by still another filter. When assembled, the central passage member is disposed between the upper receiver and the lower container and a central passage is created therethrough. Also, a chamber is formed between the perforated plastic plate of the upper receiver and the filter associated with the central passage member. The chamber permits the apparatus to more effectively filter solid phase materials from an effluent. This chamber is desirable since contact between the perforated plastic plate and the filter could damage the filter or impede filtration.

When the apparatus of the present invention is used for experimental test purposes, the solids to be tested are placed in the upper receiver on a filter above the perforated plastic plate. Next, a suitable quantity (typically 200 milliliters) of rinse water is added to the upper funnel carefully with a burette to avoid disturbing the solids. The standpipe is left uncovered during the addition of the rinse water. However, the top of the standpipe is covered after the water level rises into the standpipe. After permitting the rinse water to remain in contact with the solids for an acceptable period of time (typically 5 minutes) the rinse water can than be drawn through the solids bed under a vacuum of 5 millimeters mercury through the various filters, and into the bottom receptacle. An additional feature of this invention is that if the standpipe cover is removed or left uncovered, the vacuum applied through the vacuum tubes will only tend to assist passage of materials through the filter associated with the central passage member. This will permit collection of the effluent incrementally which may be beneficial in some cases. If the standpipe is left uncovered, the application of vacuum pressure via the vacuum tubes will have no real effect on the passage of materials through any filter associated with the upper funnel member.

For environmental control, the standpipe may be constructed so that its upper end extends below the rim of the upper funnel or receiver, thus, allowing the cover to be placed onto the receiver. The cover could be fitted with an inlet and outlet piope to allow gas flow through the upper funnel. This gas (for example, air at constant temperature and humidity) would flow through the area above the solids, being restricted from downward flow by the solids bed itself.

In the method undertaken with the apparatus of the present invention, the solids may be dried after exposure to the rinse water, and permitted to stabilize in a controlled environment and weighed periodically. Weight is determined to access (1) changes in moisture content to ascertain whether the solids have dried adequately from the previous rinse, and (2) the mass of the solids lost during filtration.

DESCRIPTION OF THE PREFERRED EMBODIMENT

Figures 1, 2:
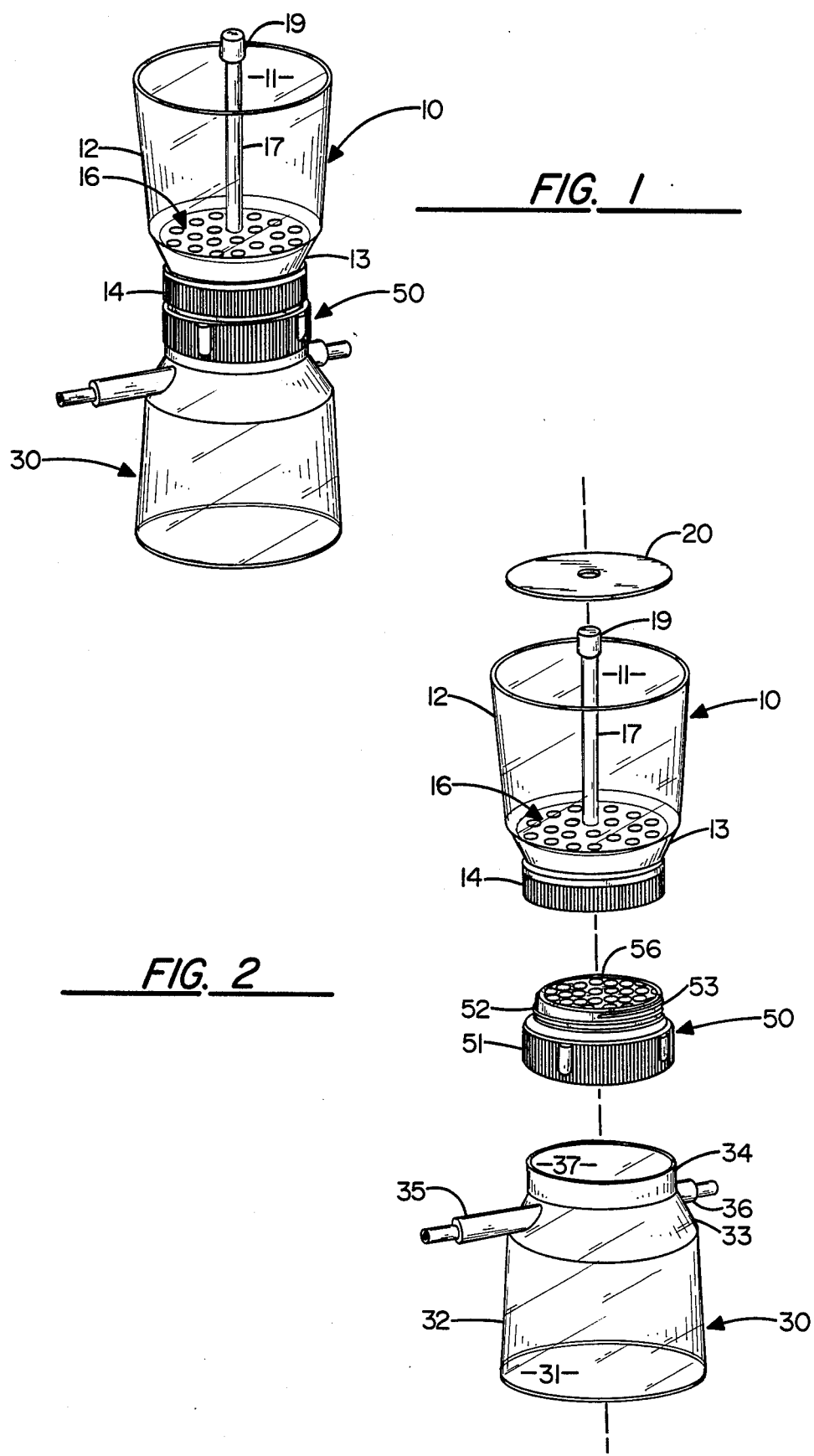
FIG. 1 is a perspective view of the various parts of the present invention in assembled relation.
FIG. 2 is a blown-apart perspective view of the leaching apparatus of the present invention.
Figure 3:
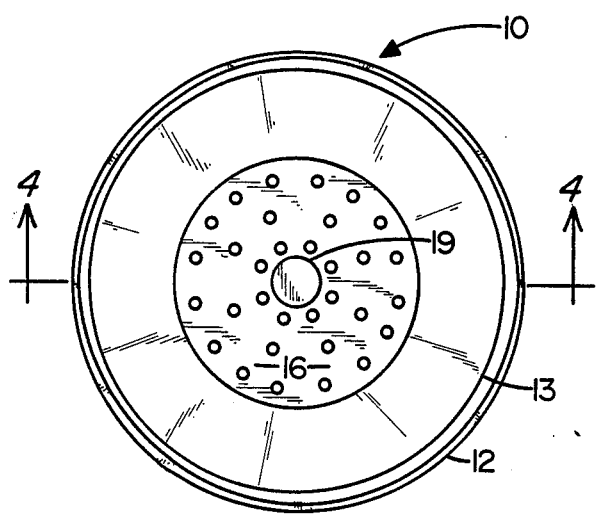
FIG. 3 is a top view of the upper receiver of the leaching apparatus.
Figure 4:
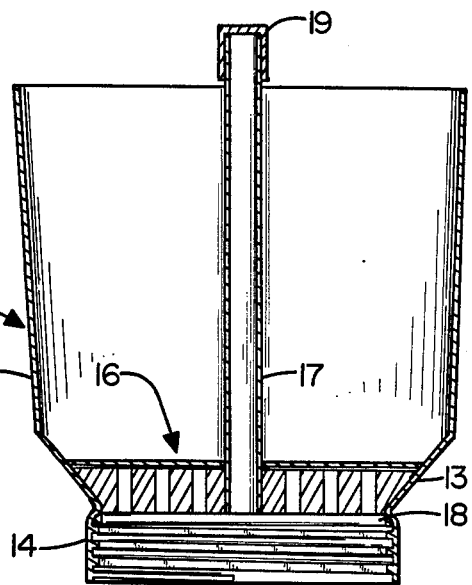
FIG. 4 is a cross-sectional view of the upper receiver through lines 4—4 in FIG. 3.
Figure 9:
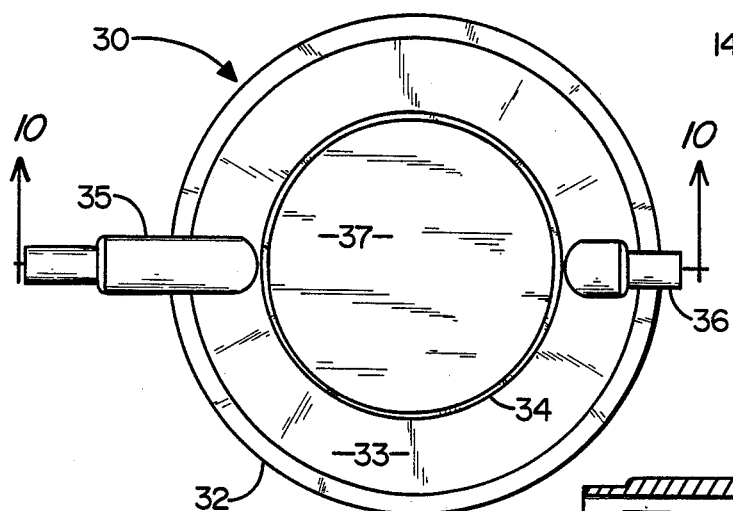
FIG. 9 is a top view of the bottom container of the leaching apparatus.
Figure 10:
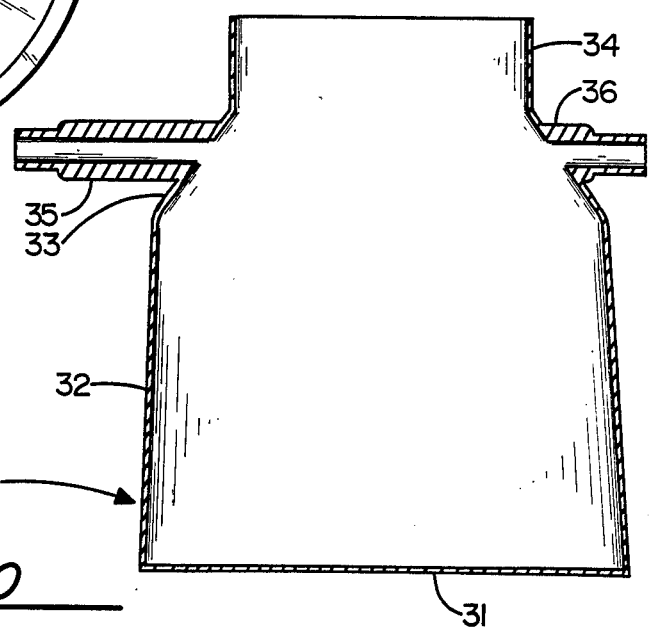
FIG. 10 is a cross-sectional view of the bottom container through line 10—10 of FIG. 9.
Figure 5:
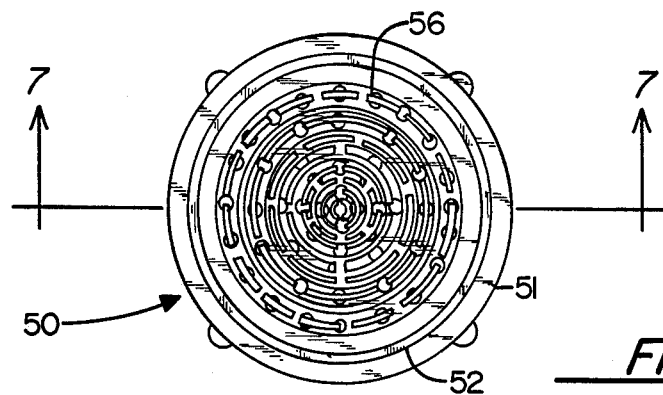
FIG. 5 is a top view of the intermediate member of the leaching apparatus.
Figure 6:
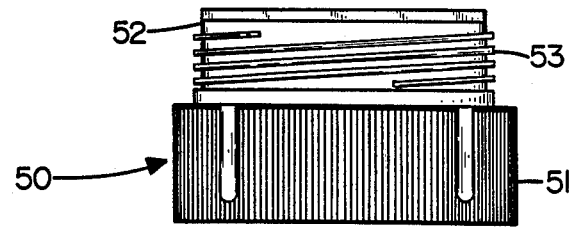
FIG. 6 is a side view of the intermediate member.
Figure 7:
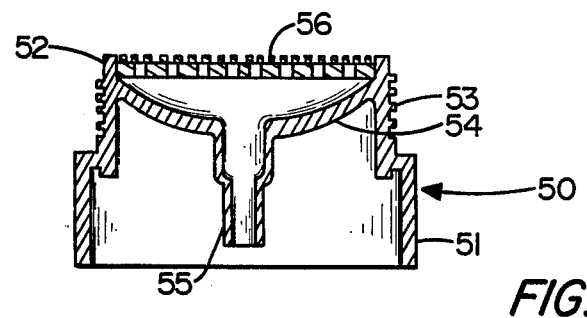
FIG. 7 is a cross-sectional view of the intermediate member through line 7—7 of FIG. 5.
Figure 8:
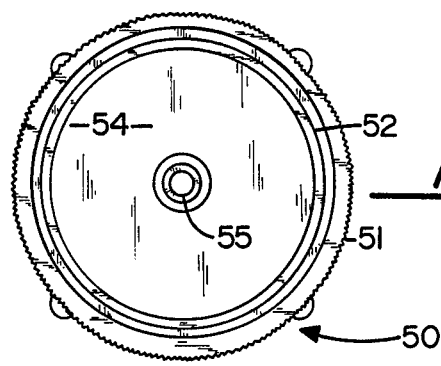
FIG. 8 is a bottom view of the intermediate member.
Figure 11:
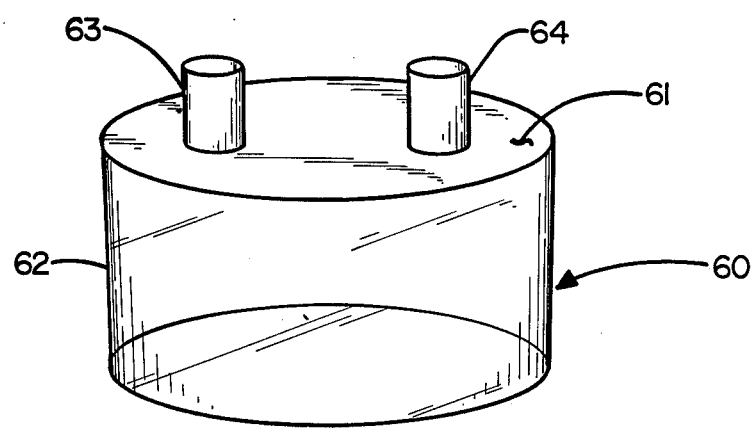
FIG. 11 is a perspective view of a cover intended to mate with the upper receiver.

The apparatus of the present invention is comprised of three separate bodies, an upper receiver or funnel member 10, a bottom receptacle or container 30 and intermediate member of coupler 50 which is intended to form a central passage between the upper funnel member and the bottom container. The apparatus can also include a cover 60 designed to fit over the upper receiver 10 for environmental control.

The upper receiver includes: (a) an open top 11, (b) a cylindrical sidewall 12, (c) a frusto-conical wall 13 projecting downwardly and inwardly from the cylindrical sidewall 12, (d) a cylindrical collar 14 having internal threads 15, (e) a perforated disc 16 which is fixedly secured about its perimeter to the bottom portion of the frusto-conical wall 13, and (f) a cylindrical standpipe 17 which is secured to the perforated disc 16 at its center and projects upwardly past the open top 11 of the cylindrical sidewall 13. Standpipe 17 is intended to provide a communicating passage from a point above the cylindrical sidewalls down past the lower surface of the perforated plate. Additionally, the upper receiver 10 may also include an O-ring 18 located inside the cylindrical collar, a removable standpipe cap 19 which is capable of covering the top of the cylindrical standpipe 17, and an additional removable filter member 20 which surrounds the cylindrical standpipe 17. When filter member 20 is used, it covers and is supported by the perforated disc 16. Further, the cylindrical sidewall 12 of the upper receiver 10 can be calibrated to enable a rough measurement of the volume of any materials that are placed in the upper receiver 10.

In the preferred embodiment, the bottom receptacle 30 has (a) a circular, closed bottom 31, (b) a cylindrical sidewall 32 which is fixedly attached to the circular closed bottom 31 and projects upwardly therefrom, (c) a frusto-conical wall 33 projecting upwardly and inwardly from the top edge of said first cylindrical sidewall 32, and (d) a secnd cylindrical sidewall 34 which projects upwardly and is attached to the frustro-conical wall member 33 at its smallest diameter. Additionally, the bottom receptacle 30 includes first and second vacuum tubes 35 and 36 which project outwardly in opposite directions from the frusto-conical wall member 33. This arrangement generally permits the evacuation of the bottom receptacle 30 through the first or second vacuum tubes 35 and 36 by a vacuum applied through a line (not shown) which is attached to either or both of the vacuum tubes 35 and 36. Further, the bottom receptacle 30 can also be calibrated in order to measure the approximate volume of any liquid materials which enter the bottom receptacle 30 through its open top 37. A more precise measure of volume can be ascertained by weighing the bottom receptacle with and without effluent and dividing the effluent mass by its density. (A density of 1 g/ml is fairly accurate when the effluent does not have a high concentration of dissolved solids.)

The intermediate member 50 includes a first cylindrical sidewall 51 having an inside diameter which is sized to receive the cylindrical sidewall 34 of the bottom diameter 30 and form a tight fit therebetween. The intermediate member 50 also includes an upper cylindrical sidewall 52 which is integrally molded with the cylindrical sidewall 51. The cylindrical sidewall 52 has a slightly smaller diameter than cylindrical sidewall 51. Further, cylindrical sidewall 52 has external threads 53 which are intended to mate with the internal threads 15 of the upper receiver 10. Also integrally molded with the upper cylindrical sidewall 52 of the intermediate member is an internal frustro-conical funnel member 54 having an outlet 55 projecting downwardly therefrom. Covering the top of the frustro-conical funnel member 54 is a filter base 56. While it is conceivable that filter base 56 be removable, in the preferred embodiment, filter base 56 is integrally molded with the top of the upper cylindrical sidewall member 52 so that it sits above the frustro-conical funnel member 54.

The assembly process is to attach the bottom receptacle 30 to the intermediate member 50. This is achieved by mating the second cylindrical sidewall 34 of the bottom receptacle 30 to the cylindrical sidewall 51 of the intermediate member. The intermediate member 50 is attached to the cylindrical collar 14 of the upper receiver member via the mating of threads 15 and 53. Before this is done, a filter (typically a 0.45 micron filter) should be placed in the filter base 56. When so assembled, a chamber exists between the lower surface of the perforated disc 16 and the top surface of the filter.

When all three components are assembled, a central passage is formed between the upper receiver 10 and the bottom receptacle 30 by the intermediate member 50.

In its intended use, a suitable quantity of solids can be placed in the upper receiver 10 through the open top 11. The upper receiver 10 holds the solids to be leached as they are dried. Next, a desired quantity of rinse water is carefully placed in the upper receiver 10. After permitting the rinse water and solids to sit and remain in contact for an appropriate period time, suction can be applied to the apparatus by an appropriate vacuum means attached to the first or second vacuum tubes 35 and 36. If it is desirable for the vacuum to assist filtration through the entire filtration system, the standpipe 17 is covered with the removable standpipe cap 19. However, if it is desirable to have the vacuum assist filtration only through the filter base 56 and the filter resting thereon, the standpipe can be left uncovered. Finally, if it is desirable to have even a greater degree of filtration than that provided by disc 16 and filter member 56, those skilled in the art will recognize that prior to placing any mateials in the upper receiver 10, an additional filter member (such as 20) can be placed in the upper receiver 10 so that it rests upon the perforated disc 16 and surrounds the standpipe. Once filtration is complete, the bottom receptacle 30, the intermediate member 50 and the upper receiver 10 may be disassembled quite easily so that appropriate laboratory tests can be made on the effluent contained in the lower container 30 or upon the solids which remain above the filters. A sample bottle (readily available) can also be placed directly into the bottom receptacle to collect the effluent from the funnel outlet, thus, avoiding any influence of the bottom receptacle on the effluent. Since the solids are generally rinsed many times, the upper receiver 10 and the solids contained therein should be stored in a somewhat controlled environment between rinses to prevent inadvertent contamination. Such environmental control can be obtained by placing a cover 60 over the upper receptacle 10. The cover 60 includes a top 61, a sidewall 62 projecting downwardly from said top and intended to mate with the sidewall 12 of the upper receptacle 10, and inlet pipe 63 and an outlet pipe 64. Pipes 63 and 64 would permit gaseous mixtures such as air at a constant temperature and humidity to flow through the area above the solids bed. The solids bed would restrict downward flow. Additionally, the residue may be weighed in order to ascertain and/or determine the full extent of loss of solids therefrom either by way of dissolved solids, suspended solids, and/or otherwise entrained solids.

What is claimed is:

1. Apparatus for separating solids from an effluent, said apparatus comprising in combination:

an upper receiver having a substantially flat base to provide for free-standing and having an open top, a generally upright cylindrical receiver sidewall, a perforated plate secured at its perimeter to a bottom portion of the receiver sidewall, and a standpipe secured at one end to the perforated plate and projecting generally upwardly therefrom;

a bottom receptacle having a closed bottom, an open top, a generally upright cylindrical receptacle sidewall, and a passage means for connection to a vacuum means, and creating a communicating passage between the vacuum means and the interior of the bottom receptacle;

an intermediate coupler, first means for removably securing the intermediate coupler to the bottom portion of the upper receiver, and second means for securing the intermediate member to a top portion of the bottom receptacle so that the intermediate member forms a communicating passage between the upper receiver and the bottom receptacle;

said intermediate coupler including a filter supporting base, said first means supporting said filter supporting base and said perforated plate in generally parallel and spaced apart relation when the intermediate coupler is secured to said upper receiver whereby said filter supporting base, coupler and perforated plate define a chamber, with said standpipe open to said chamber; and a first filter, removably supported on said filter supporting base, for substantially preventing the flow of a rinsing liquid by gravity from said chamber to said bottom receptacle, but readily permitting the passage of a liquid responsive to the application of a vacuum through said passage means to at least partially evacuate said bottom receptacle.

2. The apparatus of claim 1 also including a removable standpipe cap for selectively blocking the passage of air through the standpipe so that the application of a vacuum also assists filtration through the perforated plate of the upper receiver when said cap closes off said standpipe.

3. The apparatus of claim 1 wherein said first means for securing said intermediate coupler to the upper receiver includes:

a cylindrical collar projecting downwardly from the bottom portion of the receiver sidewall, said collar having internal threads; and an upper cylindrical portion of the intermediate coupler having exterior threads intended to mate with the internal threads of the cylindrical collar.

4. The apparatus of claim 1 including a second filter surrounding the standpipe and supported by the perforated plate.

5. The apparatus of claim 1 further including a cover for environmental control, said cover including an inlet pipe and an outlet pipe for permitting flow of gasses, said cover being constructed such that it is capable of a completely covering said open top of said upper receiver.

6. The apparatus of claim 1 wherein:

the bottom portion of said receiver side wall compriss a frustro-conical wall portion projected downwardly and inwardly from the remainder of said receiver sidewall.

* * * * *

UNITED STATES PATENT AND TRADEMARK OFFICE
CERTIFICATE OF CORRECTION

PATENT NO. : 4,783,318

DATED : November 8, 1988

INVENTOR(S) : Kim A. Lapakko

It is certified that error appears in the above-identified patent and that said Letters Patent is hereby corrected as shown below:

Column 3, Line 19, "piope" should read -- pipe --.

Column 3, Line 60, "of" should read -- or --.

Column 4, Line 26, "secnd" should read -- second --.

Column 5, Line 18, after "period" insert -- of --.

Column 6, Line 56, delete "a".

Column 6, Line 60, "compriss" should read -- comprises --.

Signed and Sealed this

Fourteenth Day of March, 1989

Attest:

DONALD J. QUIGG

Attesting Officer

Commissioner of Patents and Trademarks